(12) United States Patent
Ingels

(10) Patent No.: US 9,839,891 B2
(45) Date of Patent: Dec. 12, 2017

(54) FLUID BED CLASSIFICATION ELEMENTS

(71) Applicant: Bexo AS, Svene (NO)

(72) Inventor: Rune Ingels, Svene (NO)

(73) Assignee: BEXO AS, Svene (NO)

( * ) Notice: Subject to any disclaimer, the term of this patent is extended or adjusted under 35 U.S.C. 154(b) by 0 days.

(21) Appl. No.: 14/916,296

(22) PCT Filed: Sep. 29, 2014

(86) PCT No.: PCT/NO2014/050178
§ 371 (c)(1),
(2) Date: Mar. 3, 2016

(87) PCT Pub. No.: WO2015/047104
PCT Pub. Date: Apr. 2, 2015

(65) Prior Publication Data
US 2016/0193580 A1 Jul. 7, 2016

(30) Foreign Application Priority Data
Sep. 27, 2013 (NO) .................................. 20131290

(51) Int. Cl.
*B07B 4/08* (2006.01)
*B01J 2/16* (2006.01)
(Continued)

(52) U.S. Cl.
CPC ............... *B01J 2/16* (2013.01); *B01J 8/1872* (2013.01); *B01J 8/24* (2013.01); *B03B 4/00* (2013.01);
(Continued)

(58) Field of Classification Search
CPC ..... B01J 2/16; B01J 8/24; B01J 8/1872; B01J 8/32; B01J 2208/00672; B01J 2208/0084; B01J 2208/00938; B03B 4/00; B07B 4/08
See application file for complete search history.

(56) References Cited

U.S. PATENT DOCUMENTS 3,444,996 A * 5/1969 Walsh ....................... B03B 4/02
209/44
4,219,589 A * 8/1980 Niks ......................... B01J 2/16
159/45

(Continued)

FOREIGN PATENT DOCUMENTS

CN 1735454 2/2006
CN 1812831 8/2006
(Continued)

OTHER PUBLICATIONS

International Search Report dated Nov. 28, 2014 in corresponding International Application No. PCT/NO2014/050178.
(Continued)

*Primary Examiner* — Joseph C Rodriguez
(74) *Attorney, Agent, or Firm* — Wenderoth, Lind & Ponack, L.L.P.

(57) ABSTRACT

A classifying fluid bed granulation unit includes a perforated bed floor; a fluid bed section; a solid feed inlet or internal crushing device; a fluidization air inlet; a liquid solution or melt feed inlet and nozzles; an air outlet; and a product outlet; wherein the fluid bed section comprises at least one particle classification element comprising one or more vertically inclined channels having top and bottom end feed openings, and wherein the one or more vertically inclined channels have upper and lower side slots. In operation of the above fluid bed granulation unit, each channel of the element is separating particles into large particle and small particle fractions and transporting the large particle fraction upwards and the small particle fraction downwards in each channel, and the large particle and small particle fractions are transported out of the upper and lower side slots, respectively.

20 Claims, 12 Drawing Sheets

(51) Int. Cl.
*B01J 8/24* (2006.01)
*B03B 4/00* (2006.01)
*B01J 8/18* (2006.01)

(52) U.S. Cl.
CPC ......... *B07B 4/08* (2013.01); *B01J 2208/0084* (2013.01); *B01J 2208/00672* (2013.01); *B01J 2208/00938* (2013.01)

(56) References Cited

U.S. PATENT DOCUMENTS

| | | | |
|---|---|---|---|
| 4,545,959 A * | 10/1985 | Schilling | B01J 8/34 34/369 |
| 4,787,152 A * | 11/1988 | Mark | B01J 8/36 34/369 |
| 4,796,546 A | 1/1989 | Herstad et al. | |
| 4,902,210 A | 2/1990 | Shibata | |
| 5,198,029 A * | 3/1993 | Dutta | B01J 2/006 118/303 |
| 5,211,985 A * | 5/1993 | Shirley, Jr. | B01J 2/16 118/303 |
| 5,218,932 A * | 6/1993 | Abdulally | B01D 45/08 110/245 |
| 5,648,118 A * | 7/1997 | Liborius | B01J 2/16 427/212 |
| 6,065,224 A * | 5/2000 | Eigner | C05F 17/0247 34/135 |
| 6,159,252 A | 12/2000 | Schütte et al. | |
| 6,253,465 B1 * | 7/2001 | Ichitani | B01J 8/36 209/139.1 |
| 6,814,241 B1 | 11/2004 | Galvin | |
| 6,851,558 B2 | 2/2005 | Ingels et al. | |
| 9,199,265 B2 * | 12/2015 | Ledoux | B01J 2/16 |
| 9,370,756 B2 * | 6/2016 | Nielsen | B01J 2/16 |
| 2003/0098264 A1 | 5/2003 | Ingels et al. | |
| 2004/0101449 A1 | 5/2004 | Marchant et al. | |
| 2007/0000813 A1 | 1/2007 | Bedetti | |
| 2011/0159180 A1 | 6/2011 | Ledoux et al. | |
| 2013/0200004 A1 | 8/2013 | Galvin | |
| 2016/0047599 A1 * | 2/2016 | Jacob | B01J 8/38 34/357 |

FOREIGN PATENT DOCUMENTS

| | | |
|---|---|---|
| CN | 103002987 | 3/2013 |
| DE | 196 39 579 | 1/1998 |
| EP | 0 304 192 | 2/1989 |
| JP | 2003-190729 | 7/2003 |
| WO | 00/45959 | 8/2000 |
| WO | 01/43861 | 6/2001 |
| WO | 2008/064406 | 6/2008 |
| WO | 2009/134142 | 11/2009 |

OTHER PUBLICATIONS

Norwegian Search Report dated Mar. 12, 2014 in corresponding Norwegian Patent Application No. 20131290.
A. Callen et al., "Use of parallel inclined plates to control elutriation from a gas fluidized bed", Chemical Engineering Science, 2007, vol. 62, pp. 356-370.
Office Action dated Mar. 29, 2017 in corresponding Chinese Application No. 201480053027.5, with English Translation.
Office Action dated Apr. 2, 2017 in corresponding Saudi Arabian Application No. 516370747, with English Translation.
Extended European Search Report dated May 2, 2017 in corresponding European Application No. 14848011.4.
English translation of Austrian Patent Publication No. 3924997, published Apr. 2, 1998.

* cited by examiner

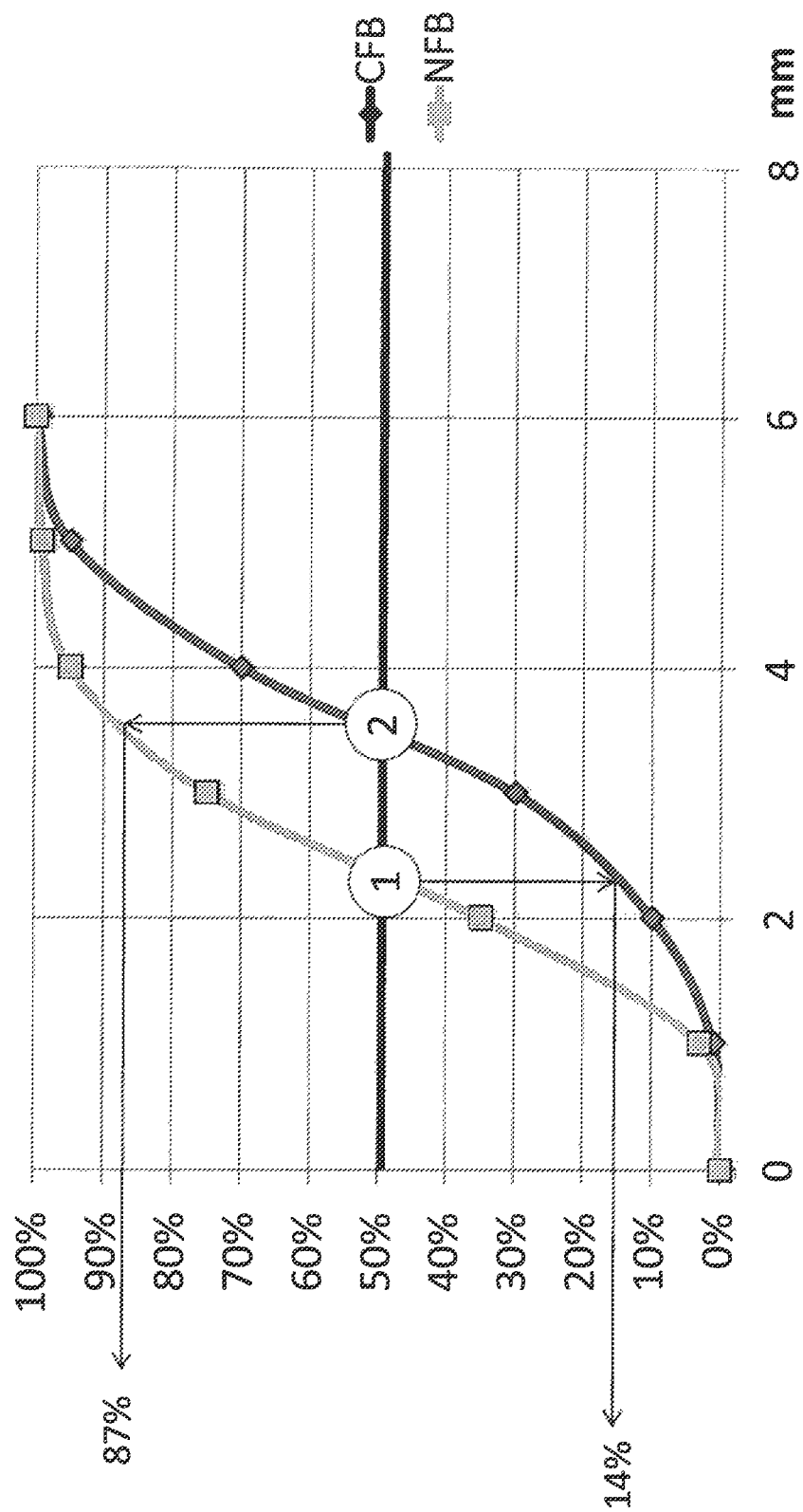

FLUID BED CLASSIFICATION ELEMENTS

TECHNICAL FIELD

The present invention relates to a classifying fluid bed granulation unit comprising in the fluid bed section at least one particle classification element, and a method for classifying granules or particles of different size inside an operating fluid bed. The method comprises the use of classifying elements which are placed in the fluid bed without restricting or obstructing the other functions of the bed. The classifying elements are using the physical differences in flow and fluidization characteristics for particles of different size to sort and transport the particles between compartments and along the walls of the bed. The method is applicable for processes using fluidization as a medium in granulation, agglomeration, accretion, aggregation or other forms of particle growth. The method is also applicable for processes which include fluidization and particle reduction or crushing.

BACKGROUND OF THE INVENTION

In the granulation processes where particle growth is the main principle, control of the size distribution in the granulator and the final product is one of the key performance features. In a conventional granulation process the size distribution has therefore been controlled by screening and recycling a certain fraction of undersize and if necessary crushing and recycling a fraction of oversize as well. This makes it possible to directly control the composition of the final product. The energy and mass balance is thereafter adjusted with the properties of the fresh feed, drying, heating or cooling in order to give the right conditions for particle growth and quality of the product. The external screening, crushing and recycling is also solving the seeding requirement, as the crushing is creating new particles keeping the overall size and number of particles in the right range.

In the latest development of the fluid bed granulation, internal screening has been one of the new features in an attempt to eliminate the investment in external recycle loop with screening and crushing. The energy and mass balance can be solved with more direct means like cooling or heating of the granulator or by altering the water concentration in the melt or solution going to the fluid bed granulator. The economy of scale has increased the size of the fluid beds, and this is further opening for good methods for internal screening or classification.

Internal screening by physical means of a mesh, screen, slots etc. is difficult when the desired effect is to retain the smallest particles and moving the biggest particles towards the outlet. Physical restrictions inside the granulator are also clogging quickly due to the plasticity and stickiness of the particles.

The most obvious methods applied have tried to take advantage of the standard and obvious effects of segregation and classification principles based on air velocities and particle trajectories. All of these methods have failed to give the expected effect or have been seen as impractical and energy intensive.

Callen et. al. "Use of parallel inclined plates to control elutriation from a gas fluidized bed" presented in Chemical Engineering Science 62 (2007) 356-370, is one of several examples where the classification or elutriation is performed in the low-density phase above or outside the high-density phase in the fluid bed unit. The definition of the high-density fluid part is where the average bulk airflow alone is below the free fall velocity of the smallest granules in the bed and above the required air minimum critical air flow to create fluidization. In the low-density phase above the high-density fluid phase, it is possible to install guide systems changing the flow characteristics vs gravity and increase the bulk speed. When the bed has a bulk airflow close to the free fall velocity of the smallest granules, and when the size distribution is broad enough, there will be classical elutriation as in standard de-dusting and wind screening technologies. This effect however is found not to be sufficient for eliminating the external screening and crushing loop. Any separation outside the high-density phase has the inherent disadvantage of external screening where the smallest particles have to be brought back to the inlet side.

U.S. Pat. No. 6,851,558 B2 is describing how asymmetry, baffles and bed height can be used to obtain a horizontal classification over a full bed. The disadvantage is however that the bed has to be fully redesigned, and that the claimed classification effect will be disturbed by the bubble formation and effect of the spraying nozzles in each compartment. The limit to inclination and position of the baffles and compartments are reducing the claimed effect in practical beds.

The way the baffles are installed, is not giving a consistent effect. The small particles on the slow side of the baffle is also prone to moving towards the outlet at the bottom of the bed, and the larger particles on the fast side of the baffle will inevitably also follow the backward direction towards the inlet side. In this way the principle described in U.S. Pat. No. 6,851,558 B2 is contradicting itself.

US2011/0159180 A1 is describing a method of granulation where a cooling tube bundle is installed in the last part of the bed. The obtained effect is that the bed is receiving an internal cooling which is important for the most fluid bed granulation processes. The other effect is a minor classification effect. The size distribution of the product is different from the average in the bed and different from size distribution found on the top of the classifier. The classification effect is however not significant enough to eliminate the external screening, crushing and recycling loop.

These and other problems will be solved with a solution according to the present invention.

SUMMARY OF THE INVENTION

The present invention relates to a classifying fluid bed granulation unit, comprising:
a perforated bed floor;
a fluid bed section;
a solid feed inlet;
a fluidization air inlet;
a liquid solution or melt feed inlet and nozzles;
an air outlet; and
a product outlet;
wherein said fluid bed section comprises at least one particle classification element comprising one or more vertically inclined channels having top and bottom end feed openings, and wherein the one or more vertically inclined channels have upper and lower side slots.

The present invention also relates to a classifying fluid bed granulation unit, comprising:
a perforated bed floor;
a fluid bed section;
an internal crushing device;
a fluidization air inlet;
a liquid solution or melt feed inlet and nozzles;
an air outlet; and
a product outlet;

wherein said fluid bed section comprises at least one particle classification element comprising one or more vertically inclined channels having top and bottom end feed openings, and wherein the one or more vertically inclined channels have upper and lower side slots.

In operation of the above fluid bed granulation unit, each channel of the element is separating particles into large particle and small particle fractions and transporting the large particle fraction upwards and the small particle fraction downwards in each channel. Further, in operation of the fluid bed granulation unit, the large particle and small particle fractions are transported out of the upper and lower side slots, respectively.

In an embodiment of the above classifying fluid bed granulation unit, the element constitutes a partial or full separation wall in the fluid bed granulation unit, and the upper and lower side slots are located at opposite sides of each channel so that the upper and lower slots are located at opposite sides of the separation wall, respectively, to make it possible through the upper slots to take out the larger particles at one side of the separation wall and through the lower slots to take out the smaller particles at the opposite side of the separation wall.

In a further embodiment of the above classifying fluid bed granulation unit, the element is arranged to separate and transport the smaller particles towards the inlet side of the fluid bed granulation unit and the larger particles towards the outlet side of the fluid bed granulation unit.

In a further embodiment of the above classifying fluid bed granulation unit, the one or more channels have a cross-section shape of a two-dimensional polygon or circle, preferably a parallelogram, rectangle or square.

In a further embodiment of the above classifying fluid bed granulation unit, the top and bottom end feed openings and/or the slots of the one or more vertically inclined channels are shaped in order to guide the flow of particles.

In a further embodiment of the above classifying fluid bed granulation unit, each channel has a cross-section minimum diameter of at least 2 times the average particle diameter, more preferably 5 to 100 times the average particle diameter, and most preferably 10 to 50 times the average particle diameter.

In a further embodiment of the above classifying fluid bed granulation unit, the one or more channels have an inclination between 1 and 80 degrees from the vertical, more preferably between 3 and 45 degrees, and most preferably between 5 and 35 degrees.

In a further embodiment of the above classifying fluid bed granulation unit, the body of the one or more channels is partly or fully double-walled.

In a further embodiment of the above classifying fluid bed granulation unit, the particle classifying element constitutes a part of or a full side wall in the fluid bed granulation unit, for moving small particles towards the inlet and the larger particles towards the outlet of the fluid bed granulation unit.

In a further embodiment of the above classifying fluid bed granulation unit comprising the solid feed inlet, the fluid bed granulation unit comprises an internal crushing device.

The present invention also relates to a method of fluid bed granulation, comprising:
supplying a solid feed material to the fluid bed section of a classifying fluid bed granulation unit;
supplying fluidization air to the fluid bed section;
supplying a liquid solution or melt through nozzles to the fluid bed section;
granulating the feed material in the fluid bed section with the liquid solution or melt to form particles; and
classifying the particles in at least one particle classification element installed in the fluid bed section of the classifying fluid bed granulation unit, the at least one particle classification element comprising one or more vertically inclined channels having top and bottom end feed openings, wherein each channel of the element is separating particles into large particle and small particle fractions and transporting the large particle fraction upwards and the small particle fraction downwards in each channel, and wherein the one or more vertically inclined channels have upper and lower side slots, wherein the large particle and small particle fractions are transported out of the upper and lower side slots, respectively, and
transporting the smaller particles towards the inlet side of the fluid bed granulation unit and the larger particles towards the outlet side of the fluid bed granulation unit.

In an embodiment of the above method of fluid bed granulation, the solid feed material is supplied through a solid feed inlet.

In a further embodiment the above method of fluid bed granulation, the solid feed material is supplied by an internal crushing device.

The present invention also relates to a use of at least one particle classification element as defined above for classification of particles in the fluid bed of an operating fluid bed granulation unit.

BRIEF DESCRIPTION OF THE DRAWINGS

FIG. 10 is showing the efficiency of a classifying fluid bed (CFB) according to the invention compared to a normal fluid bed (NFB).

DETAILED DESCRIPTION OF THE INVENTION

The present invention relates to a classifying fluid bed granulation unit comprising in the fluid bed section thereof at least one particle classification element comprising one or more vertically inclined channels having top and bottom end feed openings, and wherein the one or more vertically inclined channels have upper and lower side slots.

In an aspect, the classifying fluid bed granulation unit comprises: a perforated bed floor; a fluid bed section; a solid feed inlet; a fluidization air inlet; a liquid solution or melt feed inlet and nozzles; an air outlet; and a product outlet. Said fluid bed section comprises at least one particle classification element comprising one or more vertically inclined channels having top and bottom end feed openings, and wherein the one or more vertically inclined channels have upper and lower side slots.

In another aspect, the classifying fluid bed granulation unit comprises: a perforated bed floor; a fluid bed section; an internal crushing device; a fluidization air inlet; a liquid solution or melt feed inlet and nozzles; an air outlet; and a product outlet. Said fluid bed section comprises at least one particle classification element comprising one or more vertically inclined channels having top and bottom end feed openings, and wherein the one or more vertically inclined channels have upper and lower side slots.

In operation of the above classifying fluid bed granulation unit, particles are separated into large particle and small particle fractions and the large particle fraction is transported upwards and the small particle fraction downwards in each channel. Further, in operation of the fluid bed unit the large particle and small particle fractions are transported out of the upper and lower side slots, respectively.

Figure 3:
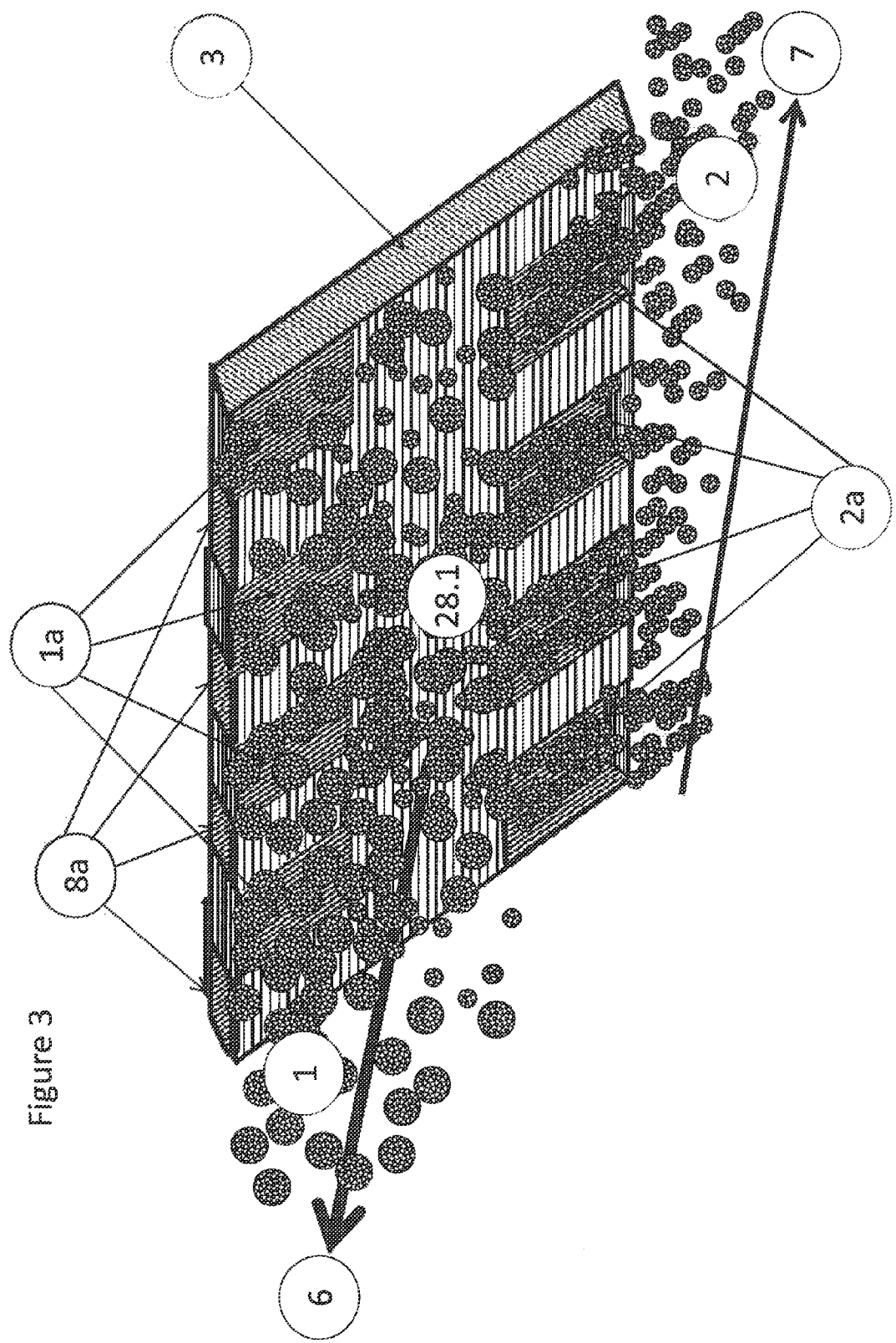
FIG. 3 is showing a four channel classification element seen in perspective.
Figure 7:
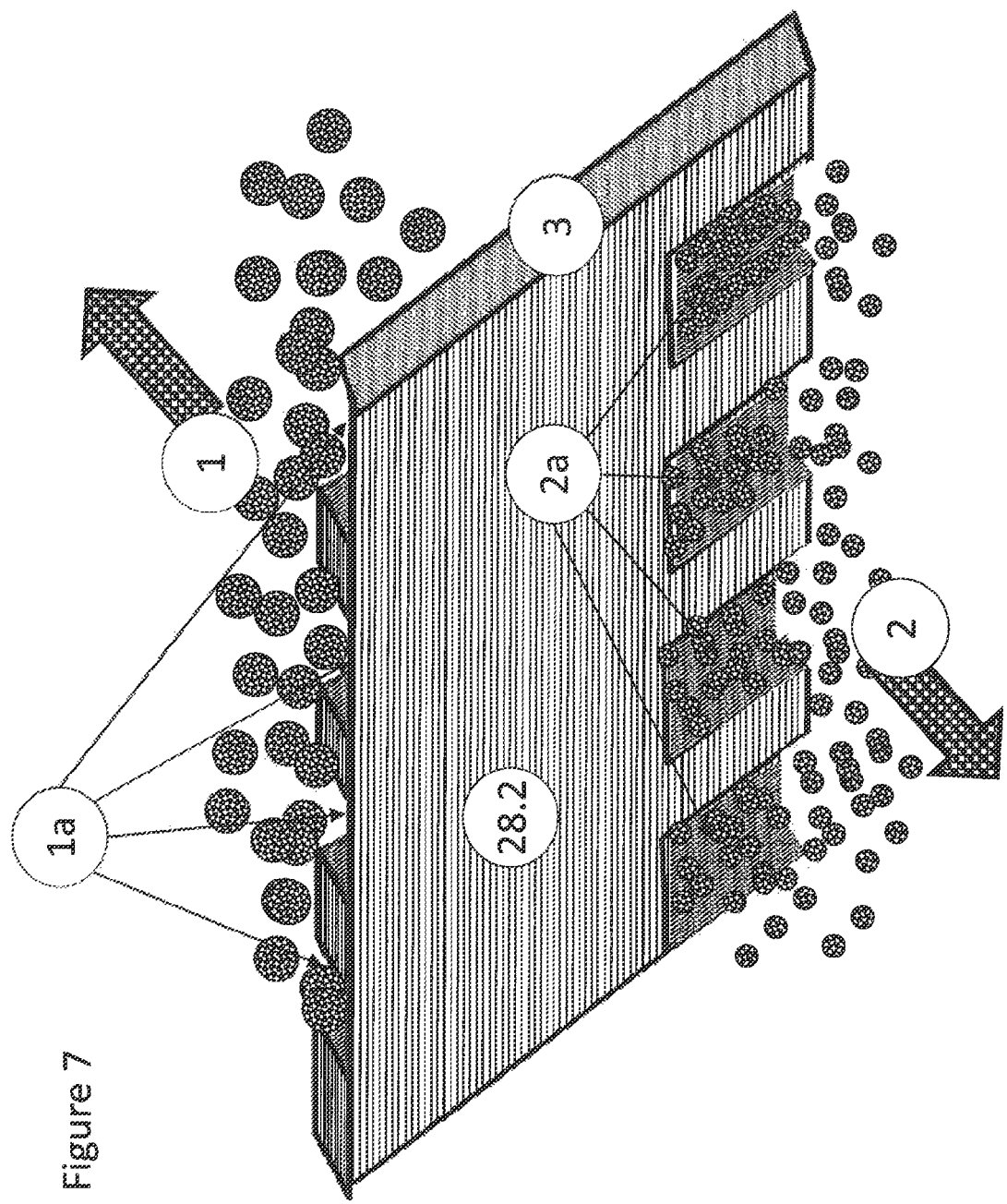
FIG. 7 is showing in perspective how such a classification element is sending small and large particles in opposite directions.

The top end feed opening and the upper slot may in one embodiment of the channel represent the top and side part of the same opening. Further, the bottom end feed opening and the lower slot may in another embodiment of the channel represent the bottom and side part of the same opening. FIGS. 3 and 7 show such embodiments.

The particle classification element is placed in the high density phase of a fluid bed. The element comprises one or more vertically inclined channels having top and bottom end feed openings. In operation of the fluid bed unit, each channel is horizontally separating the particles into small particle and large particle fractions. Further, in operation of the fluid bed unit, each channel is transporting said small particle and large particle fractions vertically in opposite directions.

The top end feed opening of the channel can be partly covered. Also, the bottom end feed opening of the channel can be partly covered.

The fluid bed granulation unit can comprise one or more compartments, also called chambers. The fluid bed granulation unit can comprise one or more particle classification elements. The fluid bed granulation unit may have an internal crushing device. The internal crushing device can produce seeding material.

The one or more vertically inclined channels have upper and lower side slots. The upper and lower side slots make it possible to take the smaller and larger particles out of each channel at a desired height and horizontal position.

The element can constitute a partial or full separation wall in the fluid bed unit. The upper and lower side slots are located at opposite sides of each channel. So, the upper and lower slots are located at opposite sides of the separation wall, respectively. This makes it possible through the upper slots to take out the larger particles at one side of the separation wall. Further, this makes it possible through the lower slots to take out the smaller particles at the opposite side of the separation wall.

The element can be arranged to separate and transport the smaller particles towards the inlet side of the fluid bed unit. Further, the element can be arranged to separate and transport the larger particles towards the outlet side of the fluid bed unit.

The one or more channels can have a cross-section shape of a two-dimensional polygon or circle. Preferably, the one or more channels can have a cross-section shape of a parallelogram, rectangle or square.

In the above particle classification element, the top and bottom end feed openings of the one or more vertically inclined channels can be shaped in order to guide the flow of particles. Further, the slots of the one or more vertically inclined channels can be shaped in order to guide the flow of particles.

Each channel can have a cross-section minimum diameter of at least 2 times the average particle diameter. More preferably, each channel can have a cross-section minimum diameter of 5 to 100 times the average particle diameter. Most preferably, each channel can have a cross-section minimum diameter of 10 to 50 times the average particle diameter.

The one or more channels can have an inclination between 1 and 80 degrees from the vertical. More preferably, the one or more channels can have an inclination between 3 and 45 degrees. Most preferably, the one or more channels can have an inclination between 5 and 35 degrees.

The body of the one or more channels can be partly double-walled. The double wall may lead a cooling or heating medium therethrough. In an embodiment, the body of the one or more channels is fully double-walled.

The particle classifying element can constitute a part of a side wall in the fluid bed granulation unit. In an embodiment, the particle classifying element constitutes a full side wall in the fluid bed unit. The particle classification element can also be placed on a side-wall inside the fluid bed granulation unit. This moves small particles towards the inlet and the larger particles towards the outlet of the fluid bed granulation unit.

If the classifying fluid bed granulation unit comprises an internal crushing device, the internal crushing device may be placed in the fluid bed section of the classifying fluid bed granulation unit. The necessary seed production may be done by crushing particles in the fluid bed.

The above described particle classification element may be installed in any classifying fluid bed granulation unit.

The present invention also relates to a method of fluid bed granulation. The method comprises supplying a solid feed material to the fluid bed section of a classifying fluid bed granulation unit. Fluidization air is supplied to the fluid bed section. A liquid solution or melt is supplied through nozzles to the fluid bed section. The feed material in the fluid bed section is granulated with the liquid solution or melt to form particles. The particles are classified in at least one particle classification element installed in the fluid bed section of the classifying fluid bed granulation unit, the at least one particle classification element comprising one or more vertically inclined channels having top and bottom end feed openings. Each channel of the element is separating particles into large particle and small particle fractions and transporting the large particle fraction upwards and the small particle fraction downwards in each channel. The one or more vertically inclined channels have upper and lower side slots, wherein the large particle and small particle fractions are transported out of the upper and lower side slots, respectively. The smaller particles are transported towards the inlet side of the fluid bed granulation unit and the larger particles towards the outlet side of the fluid bed granulation unit.

In an embodiment of the above method of fluid bed granulation, the solid feed material is supplied through a solid feed inlet to the fluid bed section of the classifying fluid bed granulation unit.

In another embodiment of the above method of fluid bed granulation, the solid feed material is supplied by an internal crushing device to the fluid bed section of the classifying fluid bed granulation unit. The internal crushing device may be a propeller.

If desired, the solid feed material may be supplied through a solid feed inlet and by an internal crushing device at the same time.

The particles may be granules. The method of the invention may be used for producing fertilizer granules.

The present invention also relates to a use of at least one particle classification element as defined above for classification of particles in the fluid bed of an operating fluid bed granulation unit.

Each channel of the element can have a length between 10 and 300 cm. Particularly, each channel can have a length between 20 and 150 cm. More particularly, each channel can have a length between 30 and 100 cm. Even more particularly, each channel can have a length between 50 and 70 cm. Each channel can have a cross-section minimum diameter between 0.5 and 20 cm. Particularly, each channel can have a cross-section minimum diameter between 1 and 10 cm. More particularly, each channel can have a cross-section minimum diameter between 2 and 5 cm. Even more particularly, each channel can have a cross-section minimum diameter between 3 and 4 cm. The average particles diameter can have a diameter between 0.1 and 20 mm. Particularly, the average particle diameter can have a diameter between 0.5 and 10 mm. More particularly, the average particle diameter can have a diameter between 1 and 5 mm. Even more particularly, the average particle diameter can have a diameter between 2 and 4 mm.

The present invention relates to classification elements which can be installed in any traditional fluid bed granulation unit without disturbing the main process. The elements are taking advantage of two principles which are not always fully comprehended, and as such was a surprise also to the inventor.

1) When objects of some volume are installed in a part of the bed and the bed height is kept constant, the weight of the process material in the bed and in this area is reduced by the weight of the corresponding volume of the object. The pressure on the bed floor in the area under the objects is reduced, giving a higher airflow and higher bed height in this area. This is the opposite of what the expression fluidized bed predicts.

2) The material inside a vertical but slightly inclined channel is observed to give a horizontal classification and a vertical movement in two directions. The larger particles move upwards under the upper side of the channel and the smaller particles are moving downwards near of the lower side of the channel. This is opposite to what most calculations and models are predicting.

Several channels can be combined in one classification element. By controlling the feed and outlet possibilities with slots at the upper side and lower side of the inclined channels, the flow of small and large particles can be separated. By installing the slots for small and large particles on opposite sides of the channels, the classification element can function as a separation wall between compartments in a fluidized bed granulator.

Figure 1:
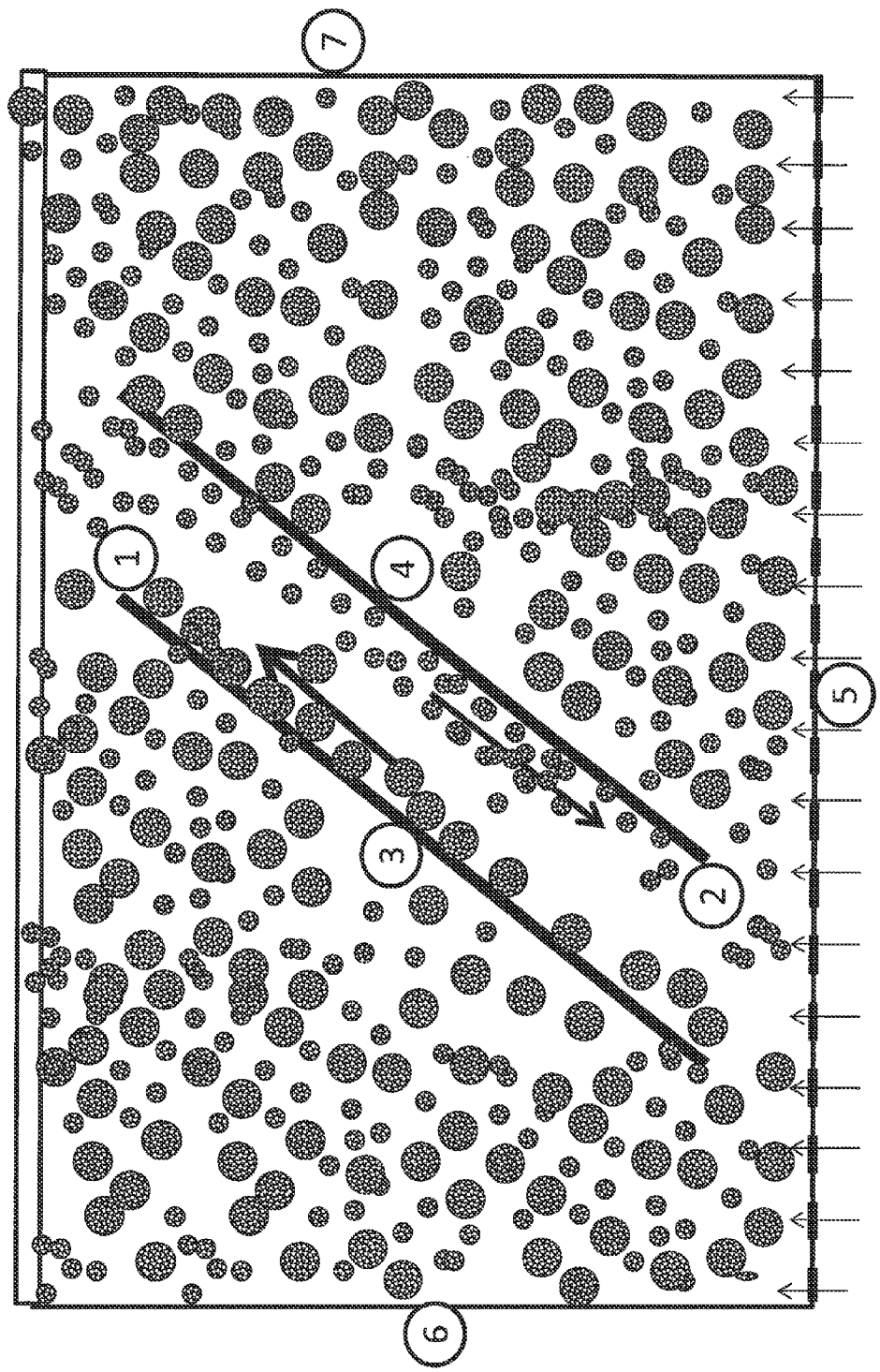
FIG. 1 is a side view showing how the particles behave in an inclined channel which is installed in the high density fluid bed.

FIG. 1 is showing a cut through side view of separation effects inside a channel placed in a in a high density fluid bed. The bed floor (5) is perforated and air is keeping the material fluidized above the critical fluidization flow rate. Inside the channel, the larger particles are concentrating towards the higher side of the channel (3) and are flowing out at the top (1). The smaller particles are concentrating towards the lower side of the channel (4) flowing out of the channel at (2).

Figure 2:
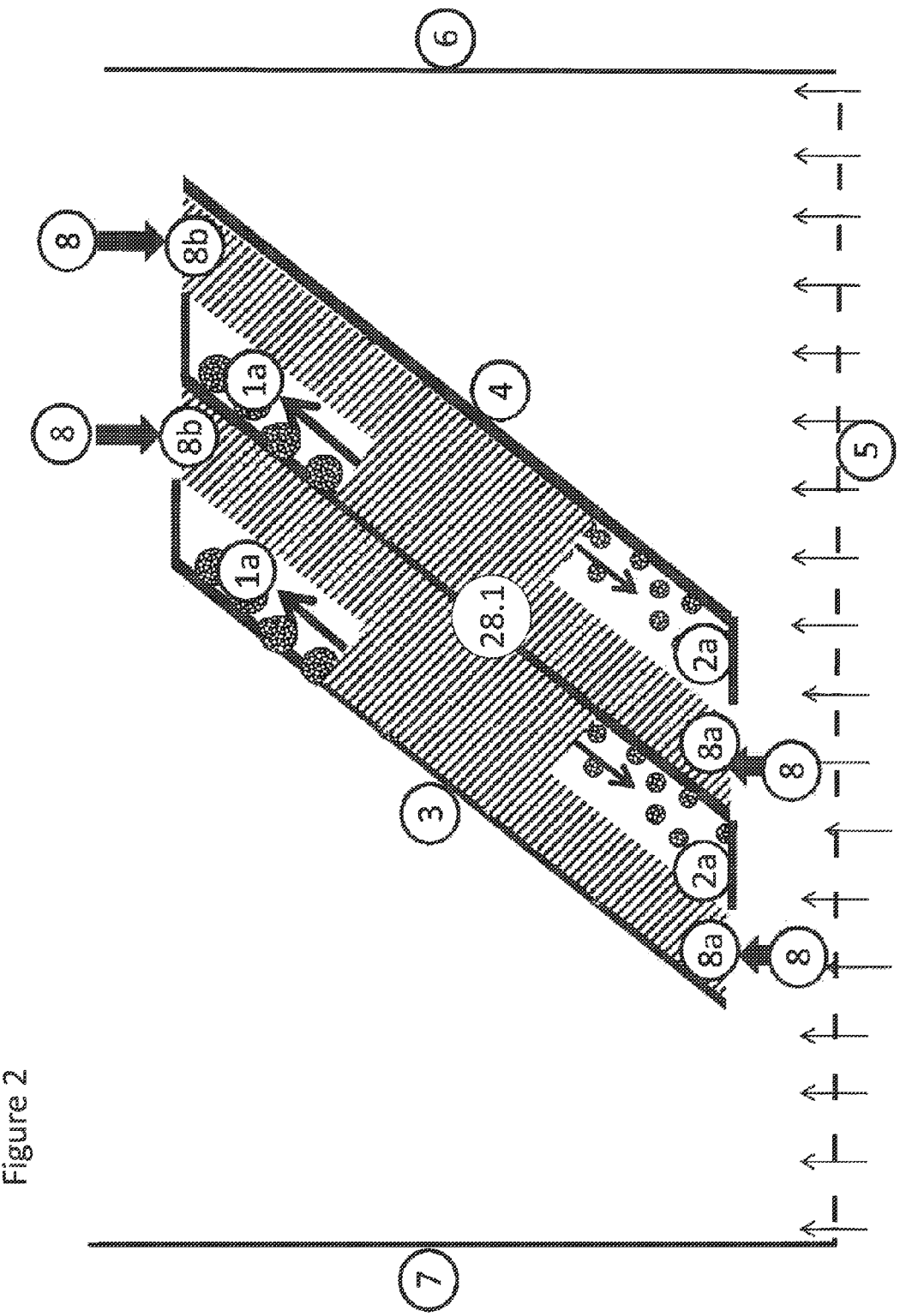
FIG. 2 is showing how slots can be installed in the upper and in the lower side of the channels, in order to separate the flow of small and large particles.

FIG. 2 is showing two channels installed on the side wall (11) in a high density fluid bed. See arrangement in FIG. 4. The back-side of the channels is totally closed as it is mounted on the side wall (11). The front side of the channels is closed except upper slot (1a) where the large particles can flow out of the channel sideways back into the bed and lower slot (2a) where the smaller particles can flow sideways back into the bed. The top side and bottom side of the channels are only partially closed to allow for sufficient feed (8) through the opening (8a) at the bottom and opening (8b) at the top. The inlet flows (8) to the channels through (8a) and (8b) have an average size distribution of the bulk material at that point. The outlet flow from slot (2a) is the fraction of smaller particles. The outlet flow from slot (1 a) is the larger fraction of the particles. The effect of the classification element (28.1) mounted on the sidewall like in FIG. 2 and FIG. 4, is transport of smaller particles towards inlet end wall (7) and larger particles towards outlet end wall (6).

Figure 4:
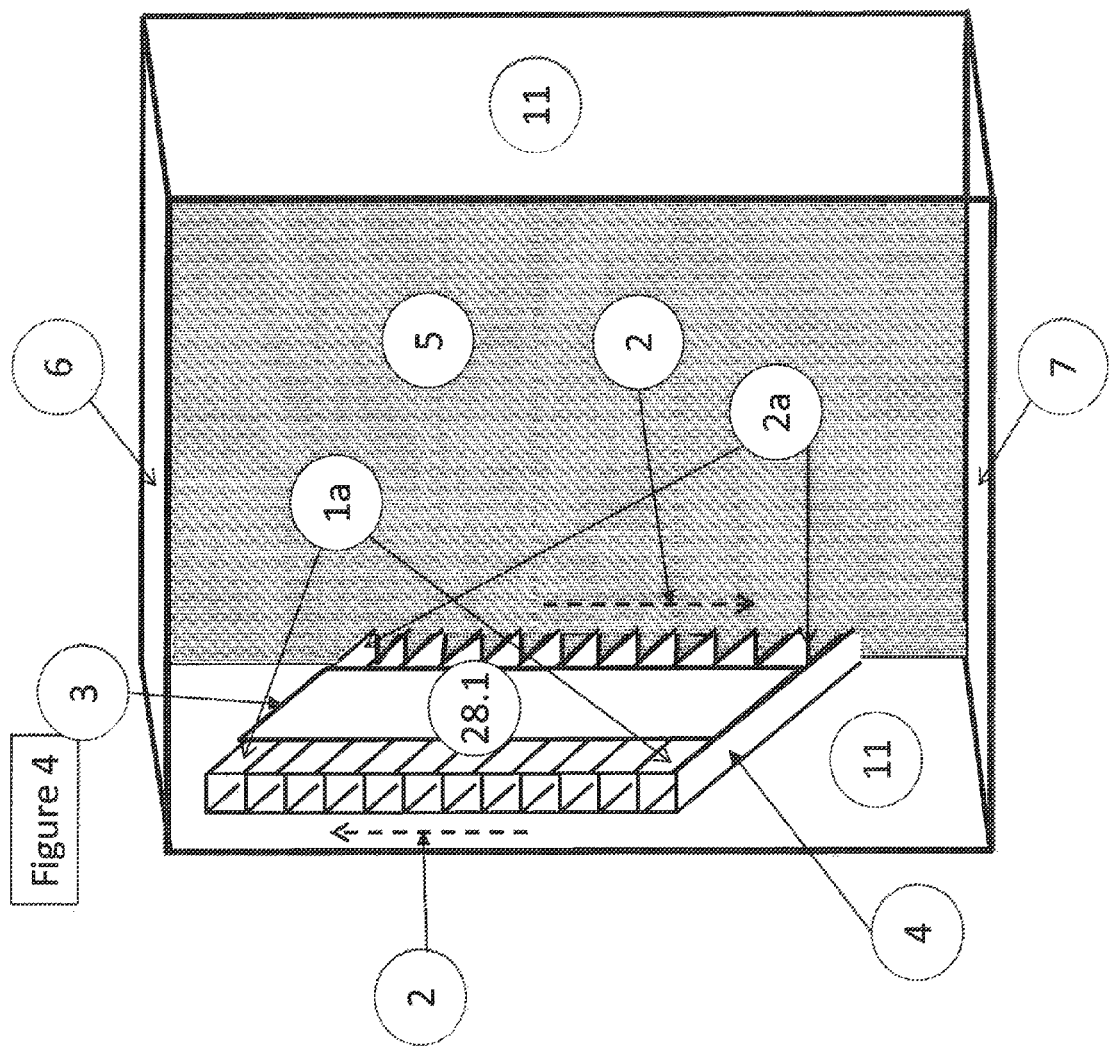
FIG. 4 is showing an embodiment of the classifying fluid bed granulation unit of the invention, wherein a side-mounted classification element is placed on the side wall of a fluid bed.

FIG. 3 is showing the overall effect of the side mounted classification element (28.1) between the inclined side (3) and the inclined side (4) having four channels, mounted on the sidewall (11) as in FIG. 4. From the top slots (1a) the flow of larger particles (1) are moved to the left, which is the outlet side (6). From the lower slots (2a) the flow of smaller particles (2) is moved to the right, which is the inlet side (7). The top opening 8a is showing where bulk feed can enter the classification element from the top. The bulk feed openings in the bottom are not visible on this figure.

FIG. 4 is showing the principle of how a classification element (28.1) with 12 channels is placed on the sidewall (11) in a fluid bed granulation unit. The classification element has the inclined side (3) close to the inlet side (7) and the inclined side (4) towards the outlet side (6) The fluid bed granulation unit consists of the two side walls (11), the perforated bed floor (5), and the outlet wall (6) and inlet wall (7). The classification element has 12 upper slots (1a) in the top transporting the larger particles (1) towards the outlet (6) and 12 lower slots (2a) transporting the smaller particles (2) towards the inlet (7). For details of slots (1a) and (2a), see FIG. 2 and FIG. 3.

Figure 5:
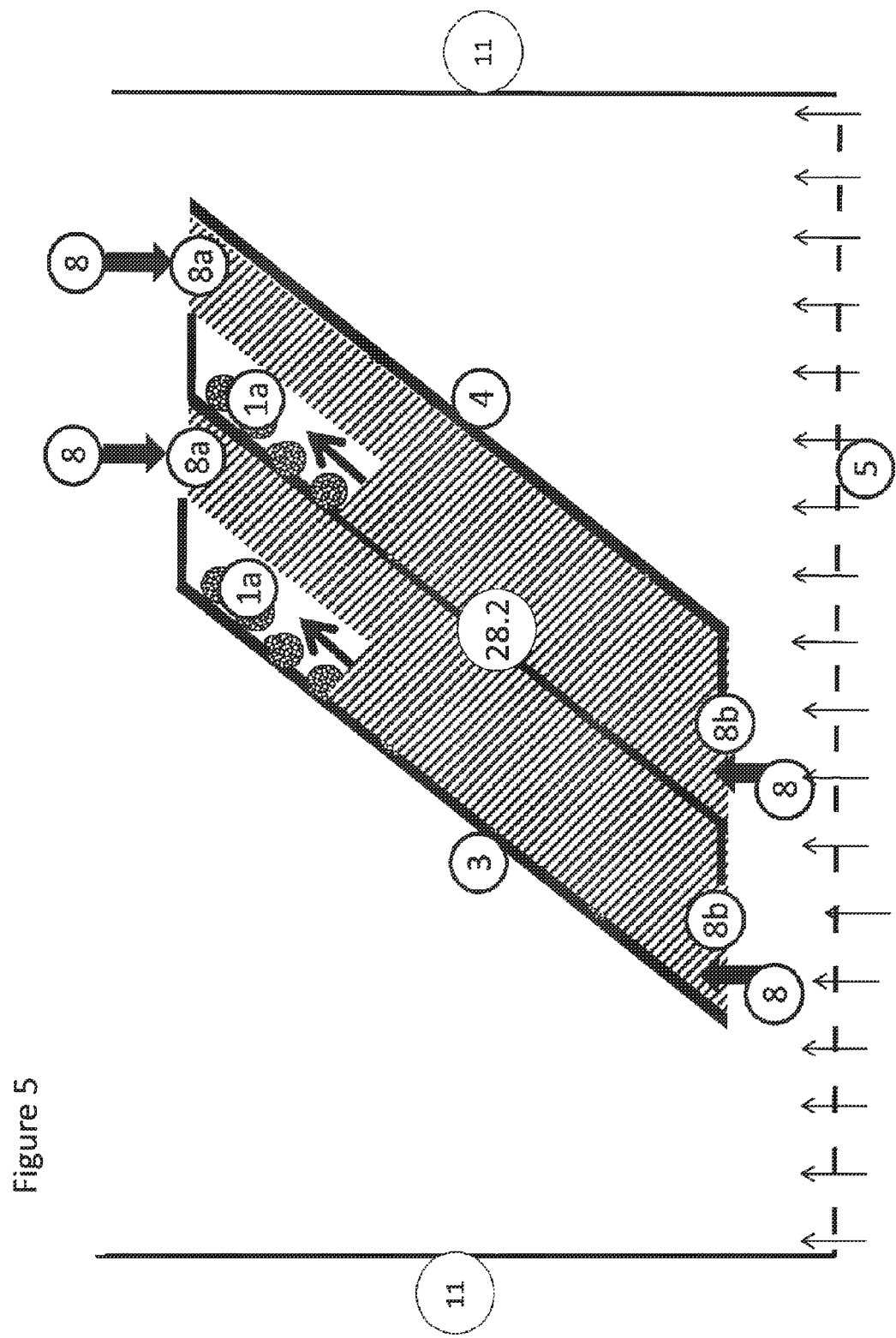
FIGS. 5 and 6 is showing how the slots can be placed on opposite sides of the channels which are forming a separation wall which will send small and large particles to opposite sides of a classification element.
Figure 6:
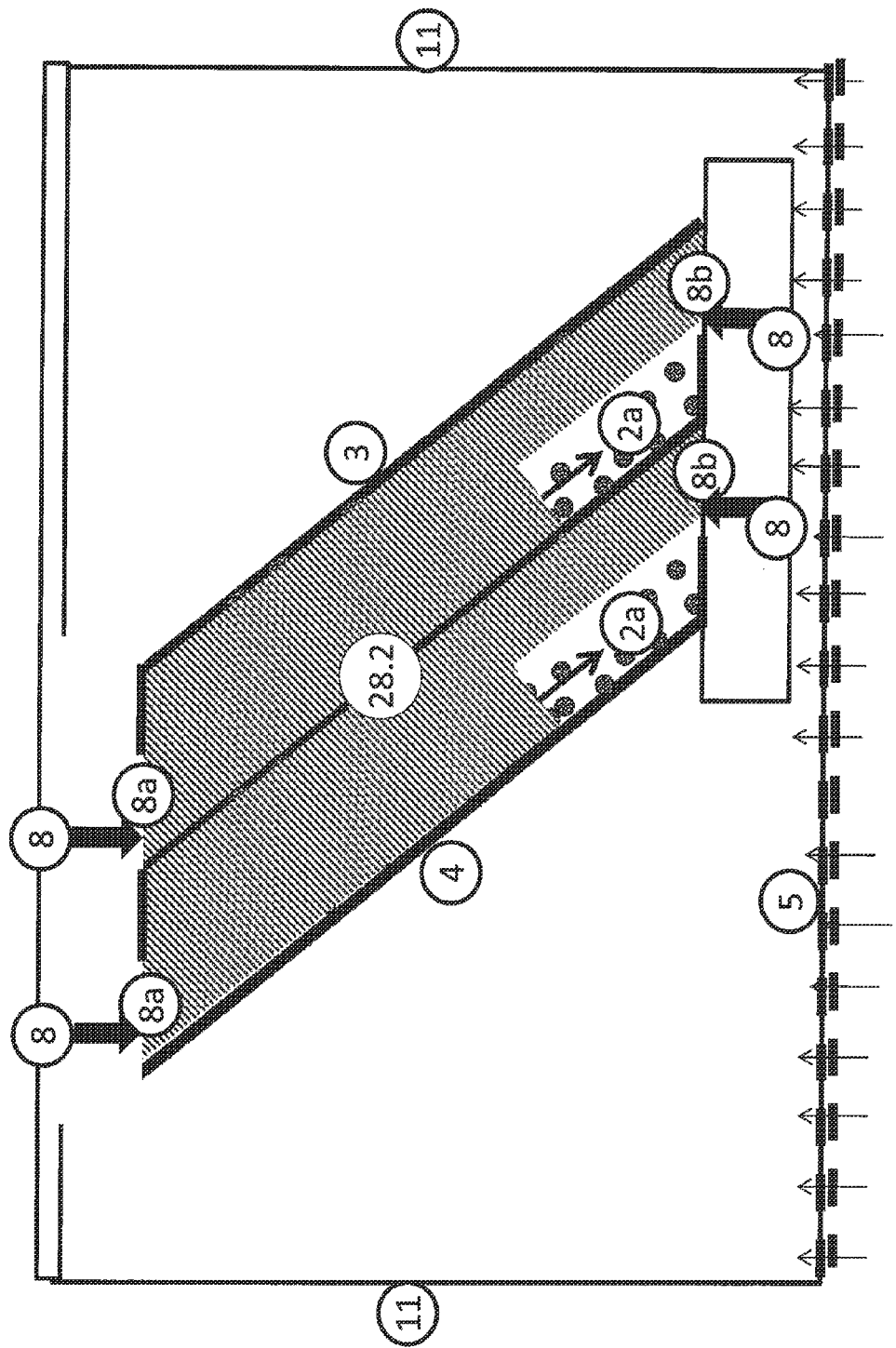

FIGS. 5 and 6 are showing the opposite sides of an element (28.2) of two channels which will function as a separation between two compartments in a fluid bed granulation unit. The principle is showed in FIG. 8.

FIG. 5 is showing the classification element (28.2) consisting of two channels between the inclined channel side (3) and inclined channel side (4) seen from the outlet side. Only the top slots (1a) for the large particles are open to towards the outlet. The feed (8) into the channels can be partly open at the top (8a) and partly open at the bottom (8b) of the channels. The side walls are (11) and the perforated floor is (5) for the fluidization air. The predominant feed flow (8) is from the bottom openings (8b).

FIG. 6 is showing the same classification element (28.2) as in FIG. 5, consisting of two channels between the inclined side (3) and inclined side (4) seen from the inlet side. The bottom slots (2a) for the smaller particles are open for sending the small particles to the feed side and thereby increase the retention time. The feed (8) into the channels are partly open at (8a) at the top and (8b) at the bottom of the channels. The side walls are (11) and the perforated floor is (5) for the fluidization air. The predominant feed flow (8) is from the bottom side through the slots (8b).

Figure 8:
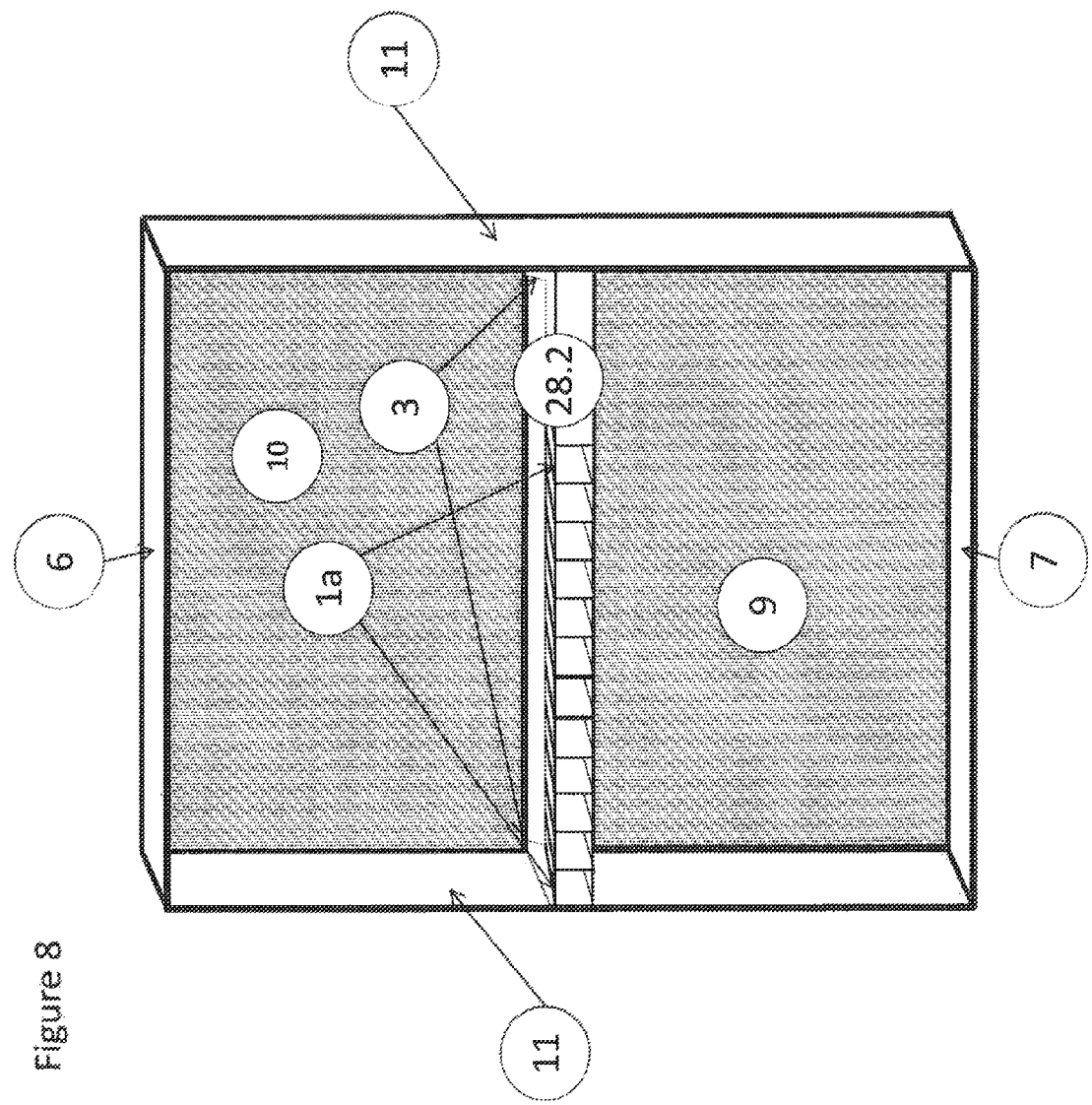
FIG. 8 is showing an embodiment of the classifying fluid bed granulation unit of the invention, wherein a classification element is used as the separation baffle between two chambers in a granulator.

FIG. 7 is showing a four channel classification element (28.2) between the inclined side (3) and the inclined side (4) seen from the feed side, mounted as in FIG. 8. The lower slots (2a) are sending the smaller particles (2) back towards the inlet side (7) giving a longer retention time. The top slots (1a) are sending the larger particles (1) towards the outlet side (6), and thereby shortening the retention time.

FIG. 8 is showing how a twelve channel classification element (28.2) is mounted as a separation wall between two chambers (9) and (10), in a fluid bed unit. Chamber (9) is the feed chamber and (7) is the inlet wall. Chamber (10) is the outlet chamber and (6) is the outlet wall. The side walls are (11). The twelve top slots (1a) have their opening towards the outlet chamber (10). The twelve lower slots (2a) are not visible from this perspective, but they have their opening slots towards the feed chamber (9) and inlet wall (7).

The effect of classifying the particles as they grow in a fluid bed granulation process can be measured as size distribution at outlet compared to the average size distribution in the bed or the size distribution from the outlet under normal operation. For small single compartment beds there is a total mixing, and the output size distribution is similar to the average bed content. In large and long operating bed, there is a plug flow effect and the outlet will be slightly larger than the average for the total bed.

A key number for a simple efficiency evaluation is the D50. The D50 is the diameter which will separate the smallest 50% and the largest 50% in two equal weights or volumes.

One way of measuring the effect of the internal classification is to use the same D50 diameter screen for the classified material and see how the weight distribution will be. If the fraction of smaller particles is reduced from 50% to 20%, the efficiency can then be calculated as (50%–20%)/50%=60%. The classification is able to keep 60% of the smallest particles back in the bed.

For large particle efficiency calculation, the reverse calculation can be done. First the D50 for the classified sample is determined. Then the same D50 diameter screening is applied to the unclassified sample. If the fraction of larger particles is increased from 10% in the unclassified sample to 50% in the classified sample, the screening effect for the larger particles is calculated as (50%–10%)/50%=80%.

Figure 9A:
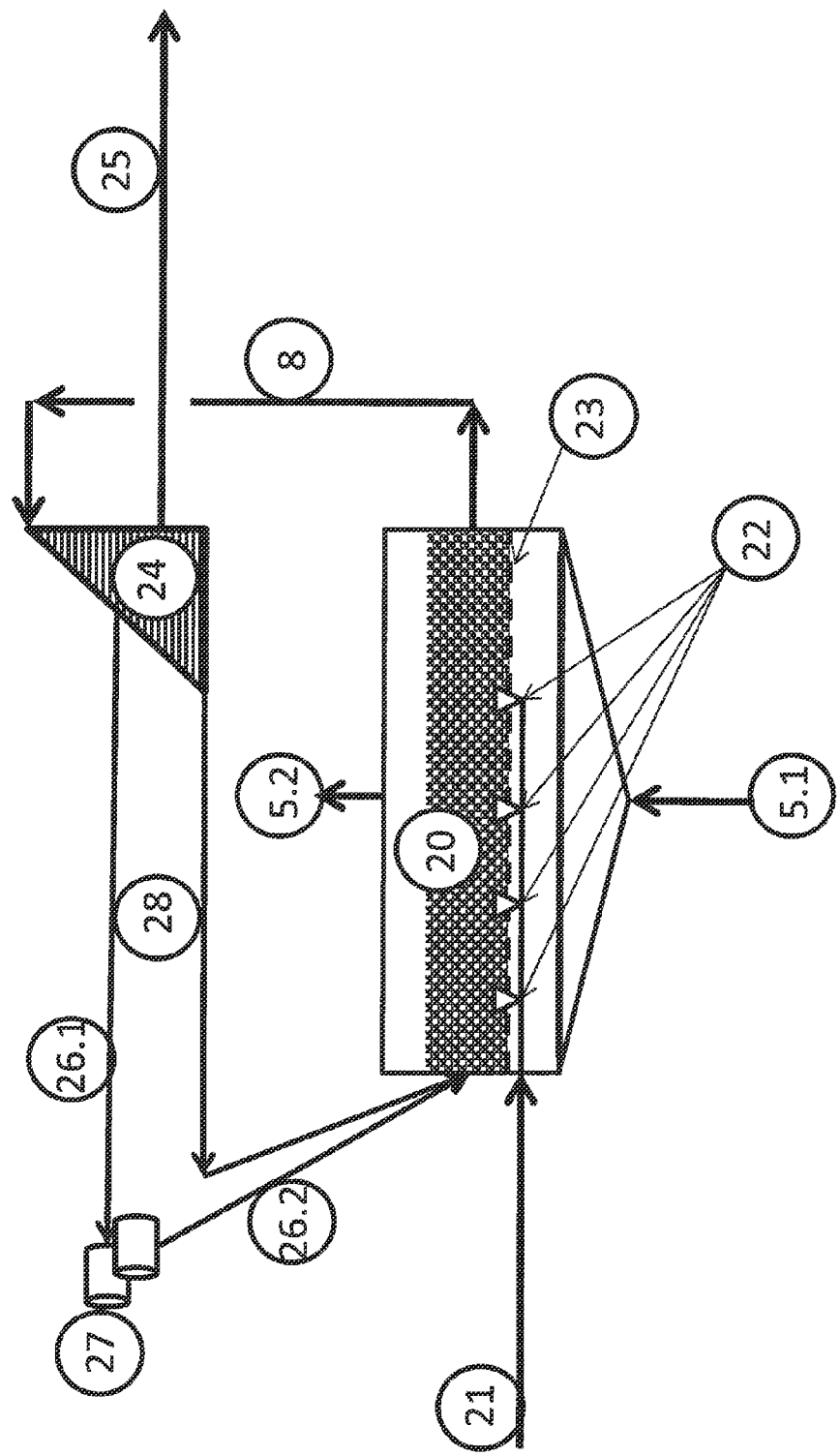
FIG. 9a is showing the main components of a fluid bed granulation process with a fluid bed granulation unit and external particle control.

FIG. 9a shows a flow diagram for a traditional granulation loop. The fluid bed granulator (20) is where the granules are fluidized and made to grow from the solution (21) which is sprayed on to them through the nozzles (22) placed in the perforated floor (23). (20.1) is showing the top of the high density fluid bed phase. The raw product (8) from the bed (20) itself has normally only 50% granules inside the product size specifications. The too small and too large particles have to be screened off in the external screen (24). The product (25) is meeting the size specifications and is is leaving the production loop. The too large particles (26.1) are crushed in the crusher (27) and recycled as seed and on size material (26.2) to the feed side of the granulation unit (20). The too small particles (28) are recycled back to the feed end of the granulation unit (20) to grow towards the right size. The granulation unit (20) is using fluidization air (5.1) to keep the product fluidized in during the granulation and cooling process. The air outlet (5.2) from the granulation unit (20) is carrying the water from the solution (21) and some dust. Flow (5.2) is scrubbed and cleaned before it is released to the atmosphere.

Figure 9B:
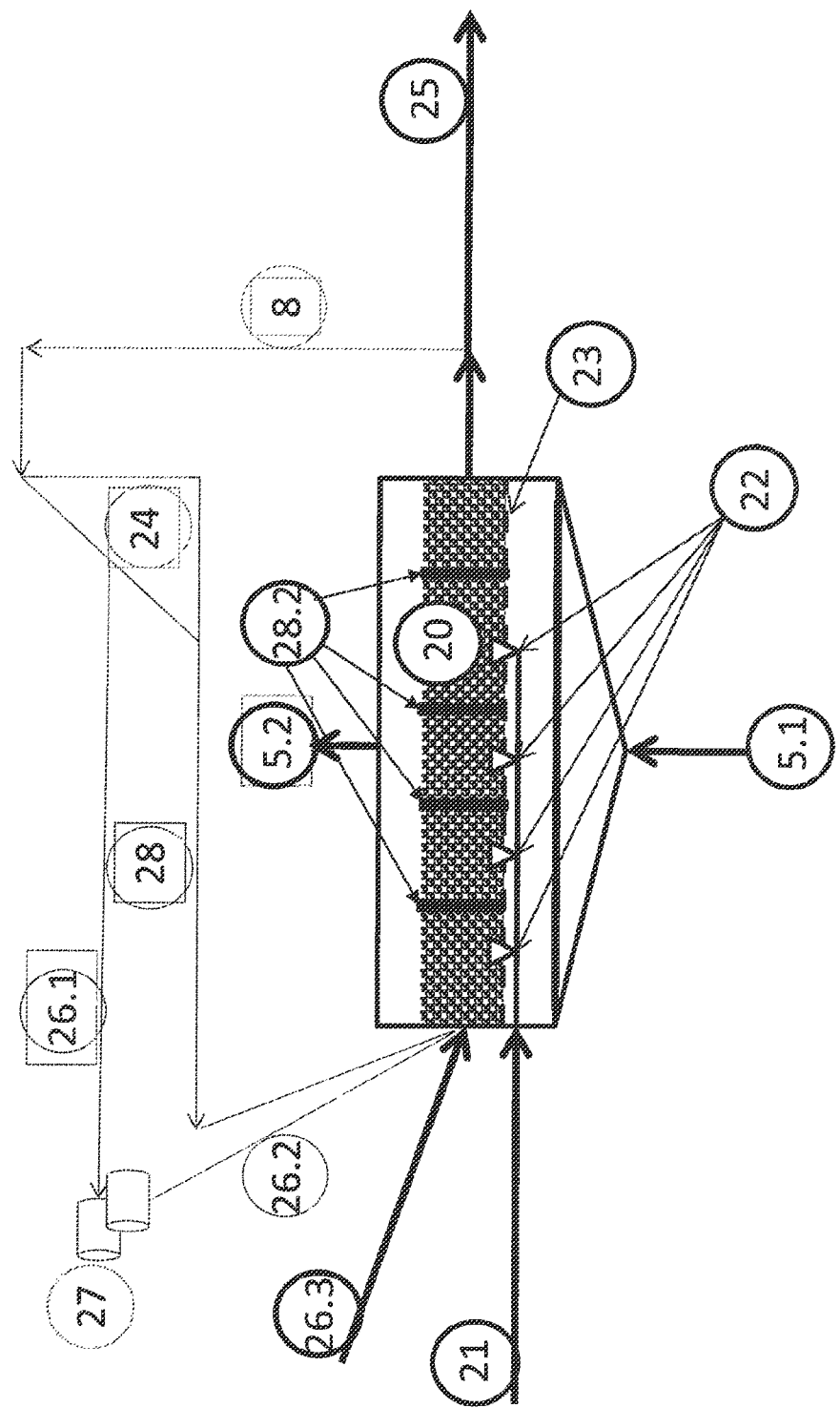
FIG. 9b is showing an aspect of the classifying fluid bed granulation unit of the invention with internal classification elements.

FIG. 9b is a flow diagram of a classifying fluid bed granulation unit of the invention with four classification elements (28.2) installed as separation walls in the high density part of the fluid bed unit (20). The level of the high density phase (20.1) is not changed. The classification elements are placed as in FIG. 8, but dividing the fluid bed unit into 5 chambers. The previous outlet of the fluid bed unit (8) is now the directly the final product (25). The solid feed to the fluid bed unit is only seed material (26.3). The feed liquid solution (21) to the fluid bed unit (20) is the same as in the classical bed. The fluidization air flow (5.1) and (5.2) is the same. The screen (24) and the crusher (27), is no longer required. FIG. 9b does not show an optional internal crushing device.

Figure 9C:
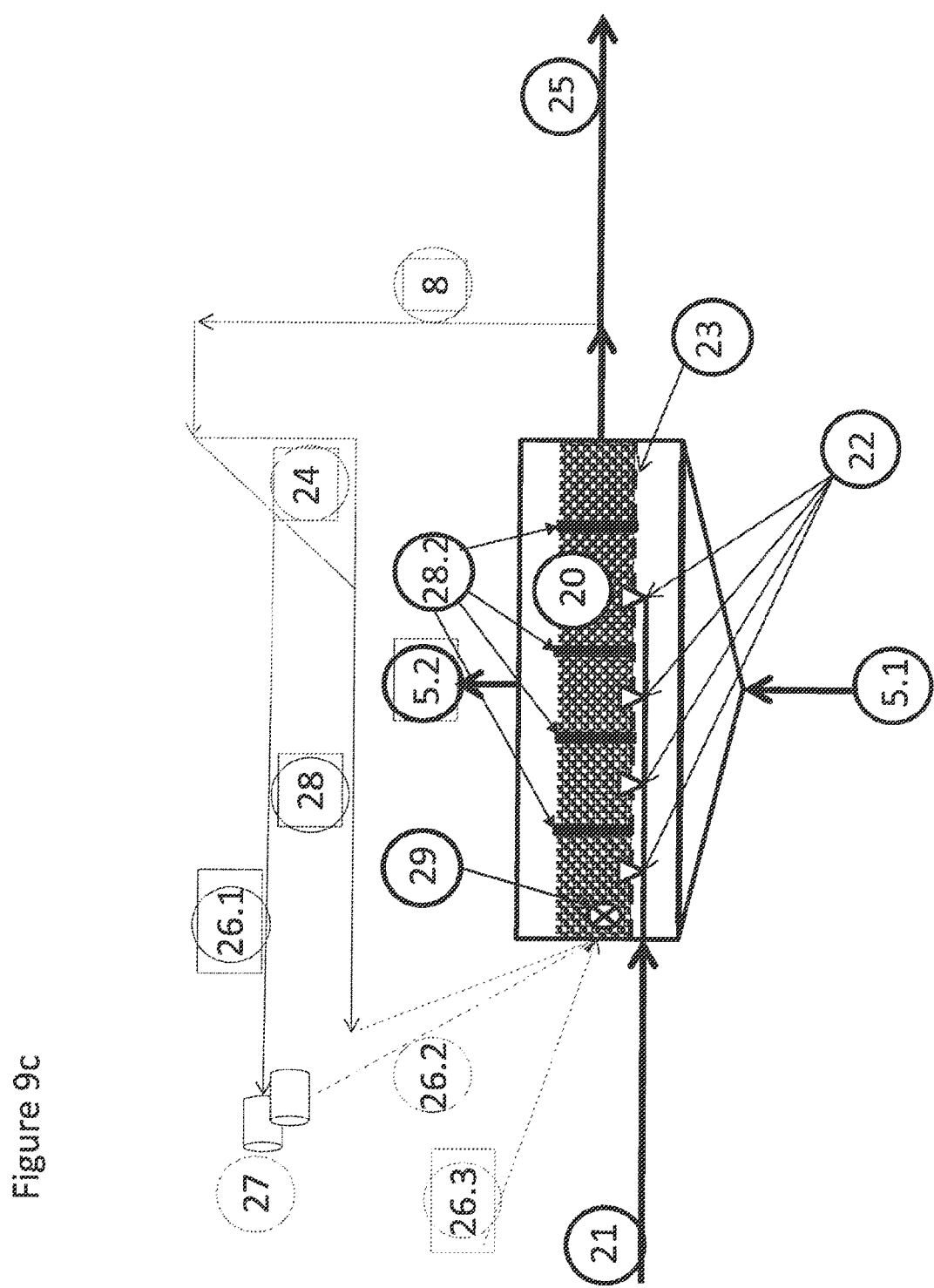
FIG. 9c is showing another aspect of the classifying fluid bed granulation unit of the invention with internal classification elements.

FIG. 9c is showing an embodiment of the classifying fluid bed granulation unit of the invention with internal classification elements and a crushing device (29) installed in the first compartment of the classifying fluid granulation unit (20), whereby the solid feed or seed material (26.3) is eliminated.

FIG. 9c is a flow diagram of a classifying fluid bed unit (20) where a crushing unit (29) is replacing the solid feed (26.3). The crushing device is crushing a fraction of the produced granules to produce seed granules. The seed granules form the basis for the final product (25). The classifying fluid bed unit has four classification elements (28.2) installed as separation walls in the high density part of the fluid bed unit (20). The level of the high density phase (20.1) is not changed. The classification elements are placed as in FIG. 8, but dividing the fluid bed unit into 5 chambers. The previous outlet of the classical fluid bed unit (8) is directly the final product (25). The feed liquid solution (21) to the fluid bed unit (20) is the same as in the classical bed. The fluidization air flow (5.1) and (5.2) is the same. The screen (24) and the crusher (27), is no longer required.

In the description of the figures, (28.1) refers to side mounted elements, and (28.2) refers to elements mounted as a separation between two chambers.

FIG. 10 is showing the efficiency of the classification. The graph is showing the accumulated size distribution of the outlet of a fluid bed granulation unit. The X-axes is the particle size in millimeter, mm, and the Y-axes is the accumulated percentage of particles smaller than the actual X-axis number. The two curves are for a Normal Fluid Bed (NFB) also numbered curve (1) and the Classifying Fluid Bed (CFB) also numbered curve (2). Curve (1) is crossing its D50 at about 2.5 mm where the curve number (1) is placed. Curve (2) is crossing the D50 at 3.5 mm where the curve number (2) is placed. From point (1) it is possible to see how the fraction of particles less than 2.5 mm is reduced by following the curve from (1) down to it meets curve (2) in the point 2.5 mm and 14%. In the Classifying Fluid Bed, the fraction smaller than 2.5 mm is reduced from 50% to 14%. The same can be done for the larger particles, by starting from point (2) going upwards until curve (1) is met in point 3.5 mm and 87%. The fraction of larger than 3.5 mm is increased from 50% to 87%.

The classification effect can be quantitatively described with three numbers. The increase of D50, which in this case has increased from 2.5 mm to 3.5 mm. The efficiency of leaving smaller particles behind in the bed, which is (50%–14%)/50%=72%. The efficiency of taking out larger particles, which is (87%−50%)/50%=74%. The overall effect is 72%×74%=53%, which is corresponding to the original, recycle ratio.

The example in FIG. 10 is from a pilot test with one classification element applied as a separation wall dividing the bed in two compartments. From the curve and calculations it is possible to see that this is enough to secure a product meeting the size distribution specification for a commercial product. By installing more elements as compartment separators and applying the side wall mounted elements, most fluid bed granulation processes can eliminate its expensive external size control arrangement.

Fluid bed granulation of Urea is a commercial success. The main three processes are operating with a large surplus of crystallization energy, because the feed solution to the granulator is between 99% and 96%. The surplus of energy is removed through the fluidization air and in an additional fluid bed cooler just after the granulator. The outside screening and crushing loop is also contributing to the cooling, and in a Classifying Fluid Bed (CFB), this has to be compensated. The present invention is solving this issue by designing the classification elements as cooling elements. The channels can be made fully or partly double walled, for internal circulation of a coolant like water. The principle and effect of internal cooling is well documented.

Another lost feature from eliminating the external screening and crushing is the inherent production of seed material. With a given size distribution for the product and a given capacity, the number of seeds can be calculated and must be controlled. An alternative production of seed material can be done in many ways. A crushing mechanism can be installed inside the bed itself or a fraction of the product can be crushed and recycled to the feed side. Urea is a product which is often given additives in order to improve its performance. These additives will often be suitable to use as seed material. The seed material should be between 0.5 and 1 mm and be chemically and physically compatible with Urea. Seed material at 1 mm for a 3.5 mm granule size shall be about 2% of the total production.

With the present invention, the main challenge in developing a Classifying Fluid Bed is solved. The remaining issues have several solutions with known principles which already have been tested out. The investment cost for a CFB process is probably 15-30% lower than for a standard fluid bed granulation process.

The invention will also make a significant contribution to revamp projects. It is expected that solving the size distribution issue will give a potential for increasing the capacity be 10-15% with a minimum of other modifications.

The invention claimed is:

1. A classifying fluid bed granulation unit, comprising:
a perforated bed floor;
a fluid bed section;
a solid feed inlet;
a fluidization air inlet;
a liquid solution or melt feed inlet and nozzles;
an air outlet; and
a product outlet;
wherein said fluid bed section comprises at least one particle classification element comprising one or more vertically inclined channels having top and bottom end feed openings, and wherein the one or more vertically inclined channels have upper and lower side slots; and
wherein the element constitutes a partial or full separation wall in the fluid bed granulation unit, and wherein the upper and lower side slots are located at opposite sides of each channel so that the upper and lower slots are located at opposite sides of the separation wall, respectively, to make it possible through the upper slots to take out the larger particles at one side of the separation wall and through the lower slots to take out the smaller particles at the opposite side of the separation wall.

2. A classifying fluid bed granulation unit, comprising:
a perforated bed floor;
a fluid bed section;
an internal crushing device;
a fluidization air inlet;
a liquid solution or melt feed inlet and nozzles;
an air outlet; and
a product outlet;
wherein said fluid bed section comprises at least one particle classification element comprising one or more vertically inclined channels having top and bottom end feed openings, and wherein the one or more vertically inclined channels have upper and lower side slots; and
wherein the element constitutes a partial or full separation wall in the fluid bed granulation unit, and wherein the upper and lower side slots are located at opposite sides of each channel so that the upper and lower slots are located at opposite sides of the separation wall, respectively, to make it possible through the upper slots to take out the larger particles at one side of the separation wall and through the lower slots to take out the smaller particles at the opposite side of the separation wall.

3. The classifying fluid bed granulation unit according to claim 1, wherein the element is arranged to separate and transport the smaller particles towards the inlet side of the fluid bed granulation unit and the larger particles towards the outlet side of the fluid bed granulation unit.

4. The classifying fluid bed granulation unit according to claim 1, wherein the one or more channels have a cross-section shape of a two-dimensional polygon or circle.

5. The classifying fluid bed granulation unit according to claim 1, wherein the top and bottom end feed openings and/or the slots of the one or more vertically inclined channels are shaped in order to guide the flow of particles.

6. The classifying fluid bed granulation unit according to claim 1, wherein each channel has a cross-section minimum width of at least 2 times the average particle diameter.

7. The classifying fluid bed granulation unit according to claim 1, wherein the one or more channels have an inclination between 1 and 80 degrees from the vertical.

8. The classifying fluid bed granulation unit according to claim 1, wherein the body of the one or more channels is partly or fully double-walled.

9. The classifying fluid bed granulation unit according to claim 1, further comprising a particle classifying element which constitutes a part of or a full side wall in the fluid bed granulation unit, for moving small particles towards the inlet and the larger particles towards the outlet of the fluid bed granulation unit.

10. The classifying fluid bed granulation unit according to claim 1, wherein the fluid bed granulation unit comprises an internal crushing device.

11. A method of fluid bed granulation, comprising:
supplying a solid feed material to the fluid bed section of a classifying fluid bed granulation unit;
supplying fluidization air to the fluid bed section;
supplying a liquid solution or melt through nozzles to the fluid bed section;
granulating the feed material in the fluid bed section with the liquid solution or melt to form particles; and
classifying the particles in at least one particle classification element installed in the fluid bed section of the classifying fluid bed granulation unit, the at least one particle classification element comprising one or more vertically inclined channels having top and bottom end feed openings, wherein each channel of the element is separating particles into large particle and small particle fractions and transporting the large particle fraction upwards and the small particle fraction downwards in each channel, and wherein the one or more vertically inclined channels have upper and lower side slots, wherein the large particle and small particle fractions are transported out of the upper and lower side slots, respectively, and transporting the smaller particles towards the inlet side of the fluid bed granulation unit and the larger particles towards the outlet side of the fluid bed granulation unit.

12. The method according to claim 11, wherein the solid feed material is supplied through a solid feed inlet.

13. The method according to claim 11, wherein the solid feed material is supplied by an internal crushing device.

14. The classifying fluid bed granulation unit according to claim 2, wherein the element is arranged to separate and transport the smaller particles towards the inlet side of the fluid bed granulation unit and the larger particles towards the outlet side of the fluid bed granulation unit.

15. The classifying fluid bed granulation unit according to claim 2, wherein the one or more channels have a cross-section shape of a two-dimensional polygon or circle.

16. The classifying fluid bed granulation unit according to claim 2, wherein the top and bottom end feed openings and/or the slots of the one or more vertically inclined channels are shaped in order to guide the flow of particles.

17. The classifying fluid bed granulation unit according to claim 2, wherein each channel has a cross-section minimum width of at least 2 times the average particle diameter.

18. The classifying fluid bed granulation unit according to claim 2, wherein the one or more channels have an inclination between 1 and 80 degrees from the vertical.

19. The classifying fluid bed granulation unit according to claim 2, wherein the body of the one or more channels is partly or fully double-walled.

20. The classifying fluid bed granulation unit according to claim 2, further comprising a particle classifying element which constitutes a part of or a full side wall in the fluid bed granulation unit, for moving small particles towards the inlet and the larger particles towards the outlet of the fluid bed granulation unit.

* * * * *